(No Model.)
H. & L. IWAN
EARTH AUGER.
No. 537,157. Patented Apr. 9, 1895.
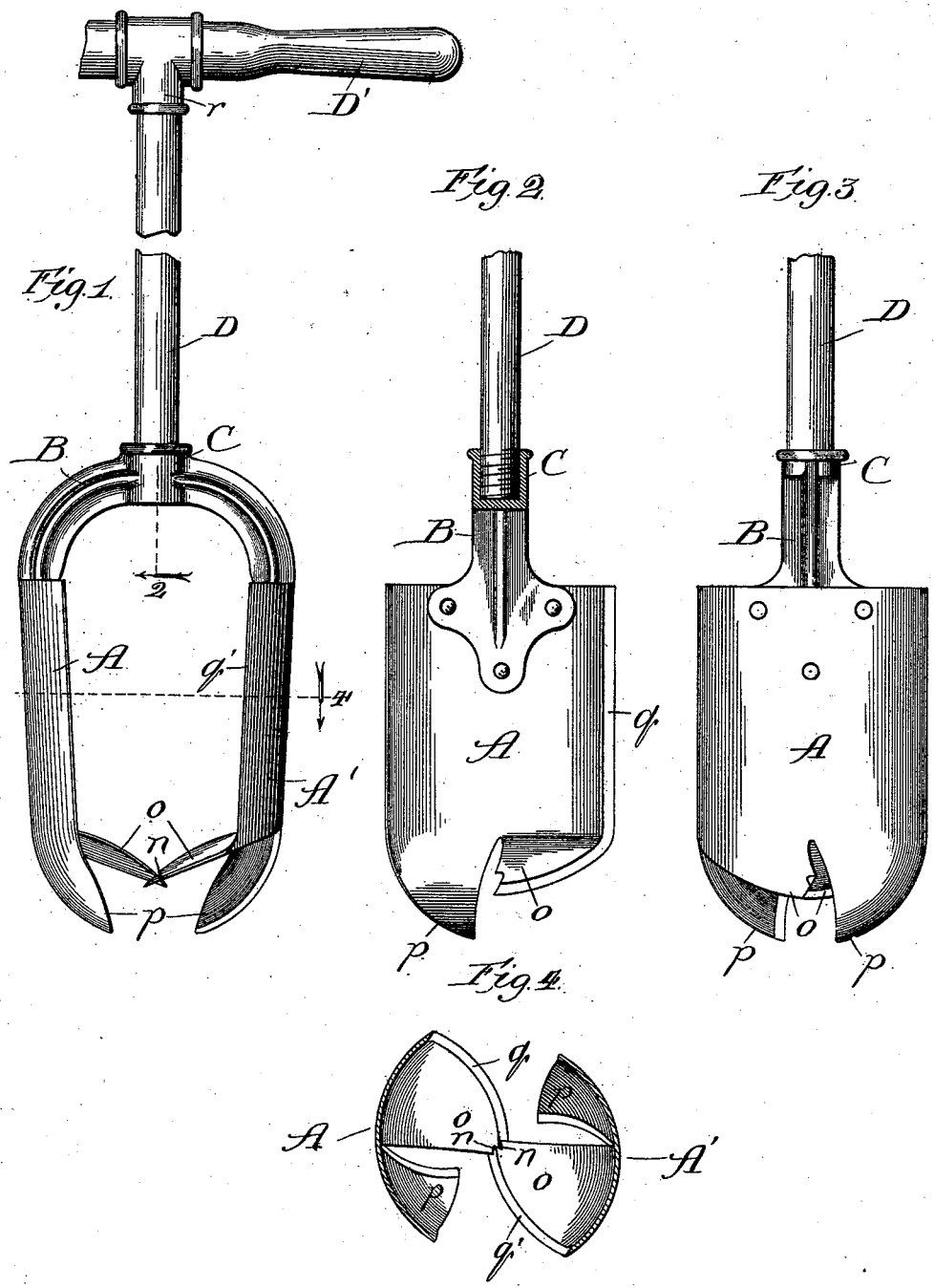
Witnesses:
Inventors
Henry Iwan,
Louis Iwan,
By Dyrenforth & Dyrenforth,
Attys.

UNITED STATES PATENT OFFICE.

HENRY IWAN AND LOUIS IWAN, OF STREATOR, ILLINOIS.

EARTH-AUGER.

SPECIFICATION forming part of Letters Patent No. 537,157, dated April 9, 1895.

Application filed January 21, 1895. Serial No. 535,628. (No model.) Patented in Canada February 7, 1893, No. 41,855.

*To all whom it may concern:*

Be it known that we, HENRY IWAN and LOUIS IWAN, citizens of the United States, residing at Streator, in the county of La Salle and State of Illinois, have invented a new and useful Improvement in Earth-Augers, (for which a patent has been granted in Canada, dated February 7, 1893, No, 41,855,) of which the following is a specification.

Our invention relates to an improvement in the class of earth augers having concavo-convex blades connected with a handle and terminating in downward and laterally cutting bits.

The objects of our invention are to provide a setting of the aforesaid blades whereby the cutting operation of the tool shall be improved; to cause the laterally cutting bits to overlap each other and interlock, thereby to strengthen the auger and improve its operation; and otherwise to improve the kind of earth auger to which our invention relates.

Referring to the accompanying drawings, Figure 1 represents our device in elevation, with the handle-portion shown broken. Fig. 2 is a broken section taken at the line 2 on Fig. 1 and viewed in the direction of the arrow. Fig. 3 is a view of the device taken at a right-angle to the representation thereof in Fig. 1. Fig. 4 is a section taken at the line 4 on Fig. 1, and viewed in the direction of the arrow.

A and A' are the two longitudinally concavo-convex blades. These we fasten, preferably, by firm riveting, as shown, respectively to opposite headed ends of a yoke B, formed, by preference, of cast malleable iron, and with a central threaded socket C, to receive the threaded end of the stem D. The preferred form of the stem is hollow, to which end we make it of gas-pipe; and it terminates at its upper end in a T-socket $r$, screwed into place, and through which the handle D', which may be of wood, is inserted to adjust it.

Each of the blades is sharpened, by chamfering, on one edge to form the cutting-edges $q$, $q'$, on opposite edges of the respective blades, the formation of which and setting in their operative positions on the yoke are such as to cause the portion of each between its fastened point and the adjacent cutting edge to describe a greater arc, or approximate arc, of a circle than the portion between the fastening point and the opposite edge. By this means the cutting edges describe the diameter of circle cut in the earth and are readily followed by the more restricted opposite edges, which in following tend to break up the more the dirt to be removed.

The blades A terminate each at its lower end, toward which the blades should converge, substantially as shown, in a downward projecting bit $p$, preferably of the somewhat oval form illustrated and sharpened on both edges, and an inward or laterally projecting bit $o$, preferably of the same general form as the bit $p$. The bits $o$, which should slant downward slightly, as represented, overlap each other at adjacent edges, where they interlock, as it were, to brace each other, being to that end, as the preferred construction for the purpose recessed to form offsets $n$, at which they mutually engage. By this construction of the inward extending bits the advantage is attained of greatly increased strength in the auger, since by causing these bits to brace each other, it is not liable to be sprung in the boring operation, as by contact with a root or stone in the ground, nor by striking the blade-end, as is frequently done, to fully discharge the contents from between the blades.

The bits $p$ and $o$ are preferably formed, as extensions of each blade, by cutting the latter at the desired place and bending one part to form the bit $p$ at an angle to the other part $o$.

The auger is operated by causing the bits $p$ to penetrate the soil to be excavated, turning the handle D' to the right, whereby the bits $p$ cut the circle and the bits $o$ loosen the material therein, which is removed by withdrawing the auger, the bits $o$ affording a bottom serving to hold even dry soil between the blades, whence the excavated soil is dumped through the spaces between the blades; and as the bits $o$ should slant somewhat, toward their cutting edges, they tend in the manner of a screw, to induce penetration of the auger, by each turn, into the soil, without requiring great, if any, pressure to be exerted by the operator.

What we claim is—

1. An earth-auger having concavo-convex blades provided at their ends with downward projecting bits $p$ and laterally extending mutually overlapping and interlocking bits $o$, substantially as described.

2. An earth-auger having concavo-convex blades terminating in downward-projecting bits $p$ and laterally extending and slanting mutually overlapping and interlocking bits $o$, substantially as described.

3. An earth-auger having concavo-convex blades terminating in downward projecting bits $p$ and laterally extending bits $o$ provided with offsets $n$ in adjacent edges and overlapping and engaging, to brace each other, at the said offsets, substantially as described.

4. An earth-auger comprising, in combination, a stem provided with a handle at one end and a yoke at the opposite end, concavo-convex blades A set at opposite ends of the yoke each to describe a greater arc toward its cutting edge from the yoke than toward its opposite edge therefrom, said blades terminating in downward projecting bits $p$ and laterally extending bits $o$ provided with offsets $n$ in adjacent edges and overlapping and engaging, to brace each other, at the said offsets, substantially as described.

HENRY IWAN.
LOUIS IWAN.

In presence of—
THEO. ROCKENFELLER,
GEO. W. ROSE.